United States Patent
Bekhtle et al.

[15] 3,690,454
[45] Sept. 12, 1972

[54] METHOD AND APPARATUS FOR MAGNETIC CONCENTRATION WITH FERROMAGNETIC SOFT IRON BODIES

[72] Inventors: Georgy Alexandrovich Bekhtle, Ljubertsy, ulitsa Kosmonartov, 19, kv. 50, Moscow; Nikolai Fedorovich Myasnikov, Belgorodskol oblasti, ulitsa Frunze, 7a, kv., Gubkin; Jury Eremeevich Mitrofanov, Belgorodskoi oblasti, ulitsa Frunze, 7a, kv. 25, Gubkin; Evgeny Stepanovich Berestov, Belgorodskoi oblasti, ulitsa Frunze, 7a, kv. 27, Gubkin; Albert Frantsevich Kalvasinsky, Belgorodskoi oblasti, ulitsa Frunze 7a, kv. 10, Gubkin; Mark Lazarevich Letbson, ulitsa Antonenko, 4, kv. 16, Leningrad, all of U.S.S.R.; Viktor Gershovich Derkach, deceased, late of ulitsa Gavanskaya, 16, kv. 33, Leningrad, U.S.S.R. by Galina Nisonvna Budnitskya, executrix

[22] Filed: Nov. 18, 1969

[21] Appl. No.: 877,662

[52] U.S. Cl. .................209/38, 209/214, 209/223, 210/222
[51] Int. Cl. ........................B03c 1/30, B03c 1/00
[58] Field of Search........209/214, 38, 223 R, 223 A, 209/232, 219, 220, 227, 222; 210/222, 223, 219, 220, 227

[56] References Cited

UNITED STATES PATENTS

| | | | |
|---|---|---|---|
| 3,349,918 | 10/1967 | Ike | 210/223 |
| 449,610 | 3/1891 | Moffatt | 209/223 A X |
| 2,074,085 | 3/1937 | Frantz | 209/38 X |
| 2,088,364 | 7/1937 | Ellis | 209/214 |
| 2,452,220 | 10/1948 | Bower | 210/222 |
| 3,375,925 | 4/1968 | Carpenter | 209/214 |

Primary Examiner—Frank W. Lutter
Assistant Examiner—Robert Halper
Attorney—Waters, Roditi, Schwartz & Nissen

[57] ABSTRACT

A method for concentrating pulverized weakly magnetic materials which include magnetic and non-magnetic fractions, by filtering the particles thereof through soft iron bodies. This method includes introducing the soft iron bodies into a magnetic field for separation of the magnetic fraction from the non-magnetic fraction and attracting the bodies against a transportation element by means of the magnetic field. Then the transportation element is moved through the magnetic field to remove the bodies and magnetic fraction from the field for separation of the bodies from the magnetic fraction. These soft-iron bodies are loosely arranged along the path, along which the transportation element moves in the magnetic field such that under the action of the magnetic field the bodies are attracted to the element and are carried by the latter through the magnetic field into a zone having no magnetic field, wherein the bodies are allowed to fall freely to separate the same from the magnetic fraction. Subsequently, the ferromagnetic balls or soft-iron bodies are redirected into the magnetic field for repeating the cycle.

8 Claims, 3 Drawing Figures

METHOD AND APPARATUS FOR MAGNETIC CONCENTRATION WITH FERROMAGNETIC SOFT IRON BODIES

This invention relates to methods and apparatus for concentrating pulverized materials.

Known in the art is a method for the concentration of pulverized weakly magnetic materials by filtering the particles thereof through soft-iron bodies, i.e., bodies retaining little residual magnetism, mainly in the form of ferromagnetic balls which are introduced into a magnetic field for separation, the material being concentrated from the non-magnetic fraction. The non-magnetic fraction is then led out of the magnetic field for separation thereof from the magnetic fraction.

For realization of the above method, use is made of an electromagnetic filter in the form of an annular vessel with a screen bottom rotating about a vertical axis, into which soft-iron bodies are placed for extracting the magnetic particles. Along the perimeter of this filter, on its inner or outer side, there are arranged one or more electromagnets which create a magnetic field in separate sections, between which there are sections having no magnetic field.

When the known method is employed with a magnetic filter and separator, both the magnetic and the non-magnetic fractions separate inefficiently from the soft-iron bodies when the latter are moved in the magnetic field and in the zone having no field, since these bodies do not move with respect to one another. More particularly, the particles of the magnetic fraction attracted to the soft-iron bodies and the particles of the non-magnetic fraction mechanically entrained by them poorly separate from these bodies. Additionally, the presence in the ores being concentrated of highly magnetic minerals leads to the gaps between the soft-iron bodies becoming clogged with these minerals, and as a result the process of separation is hampered. The presence in the initial material (pulp) of foreign objects (large particles of the material, wood chips, paper, etc.) also hampers the process of separation.

Since the filtering area in a magnetic filter and separator is limited by the gap between the poles, which does not exceed 150 – 200 millimeters, it is not possible to design a filter and separator with a high output.

An object of the present invention is to provide an improved method of concentrating a weakly magnetic material which will, in the above general type of process, insure complete cleaning of the soft-iron bodies in the zone where there is no magnetic field, which will prevent any possibility of entraining particles of the non-magnetic fraction during the process of filtering the material in a magnetic field, and which will sharply increase the output of the magnetic filter and separator with a simultaneous reduction of its weight.

This object is accomplished in a method of concentrating pulverized weakly magnetic materials in accordance with the invention by filtering the particles thereof through soft-iron bodies, preferably in the form of ferromagnetic balls, which are introduced into a magnetic field for separation of the material being concentrated from the non-magnetic fraction and which are moved out of the magnetic field for separation thereof from the magnetic fraction by moving an element for their transportation, according to the invention, by placing soft-iron bodies along the path followed by the element when it moves into the zone of action of the magnetic field. Said bodies are attracted to the element under the action of the magnetic field and are moved by it through the zone of action of the magnetic field into the zone having no magnetic field, where the said bodies are allowed to freely fall to separate the same from the magnetic fraction, after which the bodies are directed into the zone of action of the magnetic field for repeating the cycle of concentrating the material.

When filtering the material being concentrated, it is advantage to pass it through the soft-iron bodies in a direction opposite to their motion.

The abovementioned method is accomplished with the aid of a magnetic filter and separator containing a system creating a magnetic field, relative to which there moves an element for transportation of the soft-iron bodies, and a feeder for feeding the material being concentrated through these bodies when they are transported in the magnetic field. There are also a device for removal of the non-magnetic fraction arranged in the zone of action of the magnetic field, and a device for the removal of the magnetic fraction arranged outside the zone of the magnetic field. According to the invention, the element for transporting the soft-iron bodies is arranged in a receptacle having holes in its bottom and containing soft-iron bodies, which are carried along (attracted) by the element when it passes through the magnetic field and released when it passes out of the magnetic field, and a device is provided for directing the freely falling bodies into the receptacle, where a magnetic field acts.

It is preferred to provide the element for transportation of the soft-iron bodies in the form of a cylindrical drum inside of which the magnetic system is arranged.

It is also preferred to design the bottom of the receptacle with a curved shape to direct the soft-iron bodies into the zone of action of the magnetic field, being provided with holes in the form of slots.

Additionally, it is preferred to arrange in the bath two drums with a common magnetic system, which so rotate toward each other that the soft-iron bodies pass through the interval between the drums.

The soft-iron bodies are completely cleaned by letting them freely fall into the bath at the exit from the zone of action of the magnetic field. When they strike the bottom of the receptacle, the soft-iron bodies are separated from the particles of the magnetic fraction, and the water fed into the receptacle completely cleans them.

The material being concentrated is separated from the non-magnetic fraction by the mutual motion of its particles and the soft-iron bodies in a magnetic field. The particles of the non-magnetic fraction, which are not retained by the magnetic forces, are filtered out.

As a result of employing the present invention, the output of a magnetic filter and separator will sharply increase; this will be accompanied by a reduction in the weight of the device and a higher quality of separating the magnetic and non-magnetic fractions.

The nature of the present invention will become more fully apparent from a consideration of the following description of an exemplary embodiment thereof, taken in conjunction with the accompanying drawings, in which.

Figure 1:
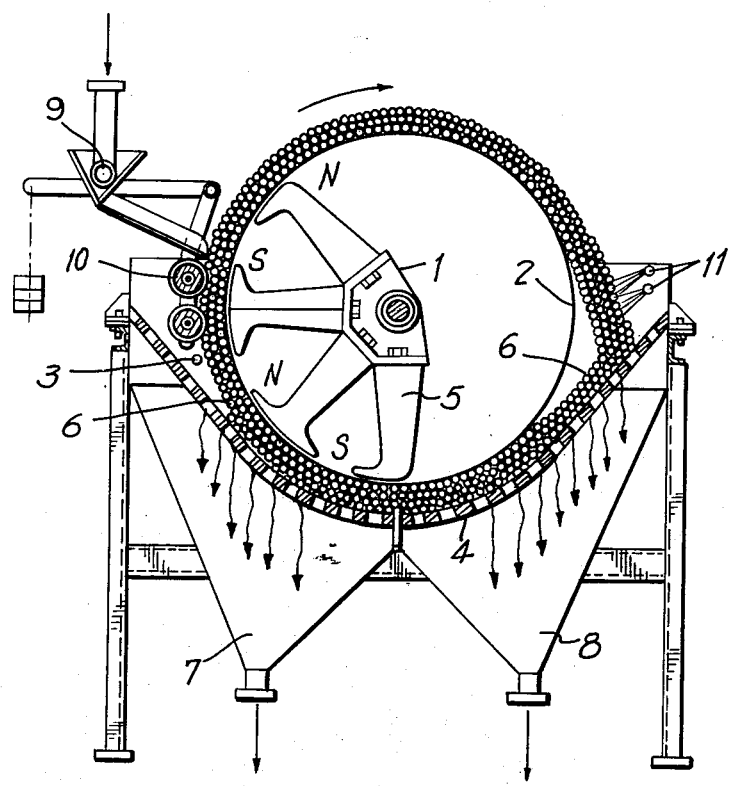
FIG. 1 shows schematically a magnetic filter and separator according to the invention, with one drum in cross section.

FIG. 1 shows schematically a magnetic filter and separator with one drum comprising magnetic system 1 with alternating poles, which is arranged inside drum 2 made of a non-magnetic material. Drum 2 together with magnetic system 1 is placed in receptacle 3 with curved bottom 4 having slot openings whose size is smaller than that of bodies 6. In the initial condition soft-iron bodies 6 are placed on the bottom of the receptacle. Below receptacle 3, at the side where the magnetic system is arranged, device 7 is provided for removing the non-magnetic fraction of the material being concentrated, and at the opposite side of the drum, in the zone where there is no magnetic field, device 8 is provided for removing the magnetic fraction of the material being concentrated.

Above the axis of drum 2 at the side of magnetic system 1 there is arranged feeder 9 for delivering the material to be concentrated, and under it there is arranged a device 10 for compacting the layer of soft-iron bodies 6 on the surface of drum 2.

On the side of drum 2 opposite feeder 9, there is installed a device 11 for supplying into bath 3 pure water for washing away the particles of the magnetic fraction.

The magnetic filter and separator function as follows:

When drum 2 rotates in the direction indicated by the arrow, soft-iron bodies 6 moving into the zone of the magnetic field are carried upwardly by drum 2 and are compacted by device 10, forming a filtering zone which the pulp of the material to be concentrated is delivered to. The particles of the magnetic fraction are attracted to bodies 6 and retained on them, while the particles of the non-magnetic fraction are carried off by the stream of water into removing device 7; the removal of the non-magnetic material particles is facilitated by the motion of bodies 6 relative to one another, this taking place when bodies 6 move from one pole of system 1 to another pole with opposite polarity. The forces of residual magnetism of bodies 6, interacting with the magnetic forces of system 1, turn bodies 6 relative to their axes.

Bodies 6 together with the particles of the magnetic fraction attracted to them are transported outside the zone of the magnetic field, where they freely fall into receptacle 3 and roll along its curved bottom 4 into the zone of action of the magnetic field. As a result of the impact against the bottom of the bath, the particles of the magnetic fraction of the material being concentrated are separated from bodies 6 and are washed out of device 4 by the water spray 11.

Figure 2:
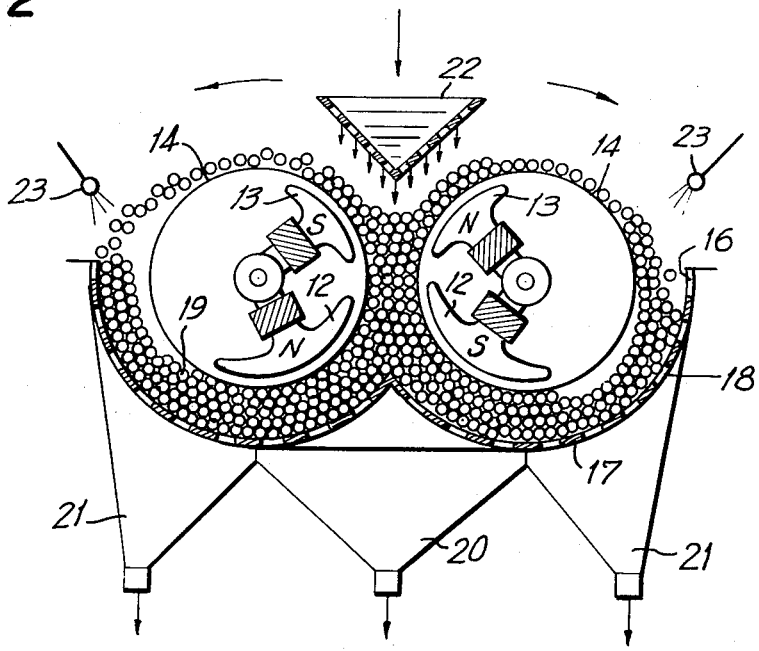
FIG. 2 shows a magnetic filter and separator according to the invention with two drums in cross section.
Figure 3:
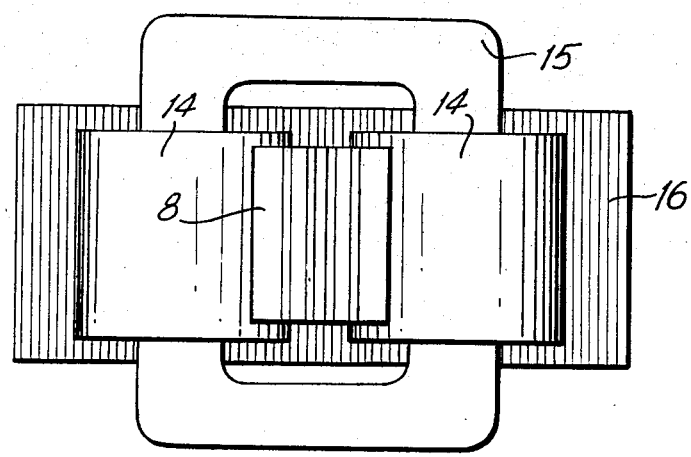
FIG. 3 is a top view of the apparatus in FIG. 7.

FIGS. 2 and 3 show a magnetic filter and separator with two drums having a common magnetic system consisting of main poles 12 forming the main magnetic field, and additional poles 13 arranged above the main ones. Additional pole 13 in each drum 14 has an opposite polarity with respect to the corresponding main pole 12 and is so arranged that the bottom edge of additional pole 13 of one drum 14 is at one level with the upper edge of main pole 12 of the other drum 14. The main and additional poles 12 and 13 of each drum 14 are connected to one another by magnetic conductor 15. Poles 12 and 13 of the magnetic system are installed in drums 14 which are made of a non-magnetic material. Drums 14 together with poles 12 and 13 are placed in receptacle 16 having a curved bottom 17 with slot openings 18.

In the initial condition, soft-iron bodies 19 are placed on bottom 17 of receptacle 16. Under the middle part of receptacle 16 there is arranged a device 20 for removing the non-magnetic fraction, and under the extreme parts of receptacle 16 there are arranged devices 21 for removal of the magnetic fraction.

In the upper part of the magnetic filter and separator between drums 14 there is arranged device 22 for supplying the material to be concentrated.

At drums 14, at the sides opposite poles 12 and 13, there are arranged devices 23 for supplying pure water.

The magnetic filter and separator function as follows:

Under the action of the magnetic field created by the magnetic system, soft-iron bodies 19 are attracted to the surface of drums 14. When the drums rotate, bodies 19 move into the space between drums 14, whence the pulp of the material being concentrated is delivered through device 22. The particles of the magnetic fraction are attracted to soft-iron bodies 19, while the particles of the non-magnetic fraction are carried off by the stream of water into removing device 20 for the non-magnetic fraction.

Upon passing through the gap between drums 14, bodies 19, when they reach the line connecting the bottom edge of the additional pole 13 of one drum 14 to the upper edge of the main pole 12 of the other drum 14, being turned by the forces of residual magnetism and the change in the polarity of the field, are separated into two approximately equal streams and are conveyed to beyond the limits of action of the magnetic field, where they are separated from the drum, freely fall into receptacle 16 and roll down into the zone of action of the magnetic field along its curved bottom.

The impact against the bottom of bath 16 makes the particles of the magnetic fraction separate from bodies 19, and they are removed by water from device 23 into removing device 21 for the magnetic fraction.

The magnetic filter and separator with two drums, owing to the uniform intensity of the magnetic field, makes it possible to obtain concentrations of a higher quality.

When concentrating oxidized ferruginous quartzites from primary deposits with a content of 40 percent iron in a single-drum magnetic filter and separator, a concentrate was obtained containing 65 percent iron with extraction of 77 percent and with an output of seven tons per hour per meter of drum length.

When concentrating lean titanium-magnetic ores containing 6.8% $TiO_2$ on industrial specimens of magnetic filters and separators with an output of 20 – 25 tons per hour with one recleaning of the tailings, dump tailings were obtained containing 2.2% $TiO_2$ with a yield of 51 percent. The concentrate contained 11.8% $TiO_2$.

When vacuum pumps are connected to removing devices 7 and 8 in the single-drum magnetic filter and separator and to devices 20 and 21 in the double-drum magnetic filter and separator, the material can be concentrated in a dry state.

What we claim is:

1. A method of concentrating pulverized magnetic and weakly magnetic materials from mixtures of materials including magnetic, weakly magnetic and non-magnetic fractions comprising filtering a pulp of the magnetic and the weakly magnetic pulverized particles thereof through discrete soft-iron bodies, while introducing the soft iron bodies and said mixture of materials into a magnetic field generated by a magnetic system positioned within a portion of a transportation element for separation of the magnetic and the weakly magnetic fractions from the non-magnetic fraction and attracting said bodies against said transportation element by means of said field, moving the transportation element through the magnetic field for separation of the bodies from the non-magnetic fraction, segregating said non-magnetic fraction, the soft iron bodies being loosely arranged within an open-bottomed receptacle along the path along which said element moves in said magnetic field so that, under the action of the magnetic field, said bodies are attracted to the element and are carried by the latter through the magnetic field into a zone having no magnetic field and wherein said bodies are allowed to fall freely to separate them from the magnetic and the weakly magnetic fractions, segregating said magnetic and weakly magnetic fractions and subsequently redirecting the bodies into the magnetic field for repeating the cycle.

2. A method as claimed in claim 1, wherein the material to be concentrated is fed through the soft-iron bodies in a direction opposite to the motion of the latter.

3. A method as claimed in claim 1 wherein said bodies are provided in the form of loose ferromagnetic balls.

4. A magnetic separator comprising a receptacle including a bottom provided with openings; magnetic means creating magnetic fields in a first portion of the receptacle; discrete soft iron bodies in said receptacle; transportation means for the displacement of said soft iron bodies positioned for carrying along under the action of said magnetic fields the bodies which are in said receptacle; means for moving such transportation means; a feeder for supplying a pulp of the material to be concentrated through said soft iron bodies which are displaced by said transportation means; a means for receiving and removing from said bottom the non-magnetic fraction in said magnetic fields separated from the magnetic and the weakly magnetic fractions by said fields; a means outside said fields for receiving and removing from said bottom the magnetic and the weakly magnetic fractions separated from said bodies when the latter leave said fields and fall freely from said transportation means; said bottom directing said freely falling soft iron bodies into said first portion of the receptacle where the said magnetic means acts to attract the bodies to said transportation means.

5. A magnetic filter and separator as claimed in claim 4, wherein the said transportation means includes a cylindrical drum of a non-magnetic material inside of which the said magnetic means is arranged.

6. A magnetic separator as claimed in claim 3, said bottom being of a curved form and being provided with slot openings whose size is smaller than the size of said bodies.

7. A magnetic separator as claimed in claim 3, wherein said transportation means includes two drums containing said magnetic means and adapted to rotate towards each other so that said soft iron bodies are transported in a gap between said drums.

8. A magnetic separator as claimed in claim 4 wherein said bodies are ferromagnetic balls.

* * * * *

UNITED STATES PATENT OFFICE
CERTIFICATE OF CORRECTION

Patent No. 3,690,454                    Dated September 12, 1972

Inventor(s) Georgy Alexandrovich Bekhtle, et. al.

It is certified that error appears in the above-identified patent and that said Letters Patent are hereby corrected as shown below:

On the cover sheet, item [72], lines 13 and 14, "Mark Lazarevich Letbson" should read -- Mark Lazarevich Letfson -- .

Signed and sealed this 2nd day of January 1973.

(SEAL)
Attest:

EDWARD M. FLETCHER, JR.                 ROBERT GOTTSCHALK
Attesting Officer                       Commissioner of Patents